United States Patent Office 3,381,231
Patented Apr. 30, 1968

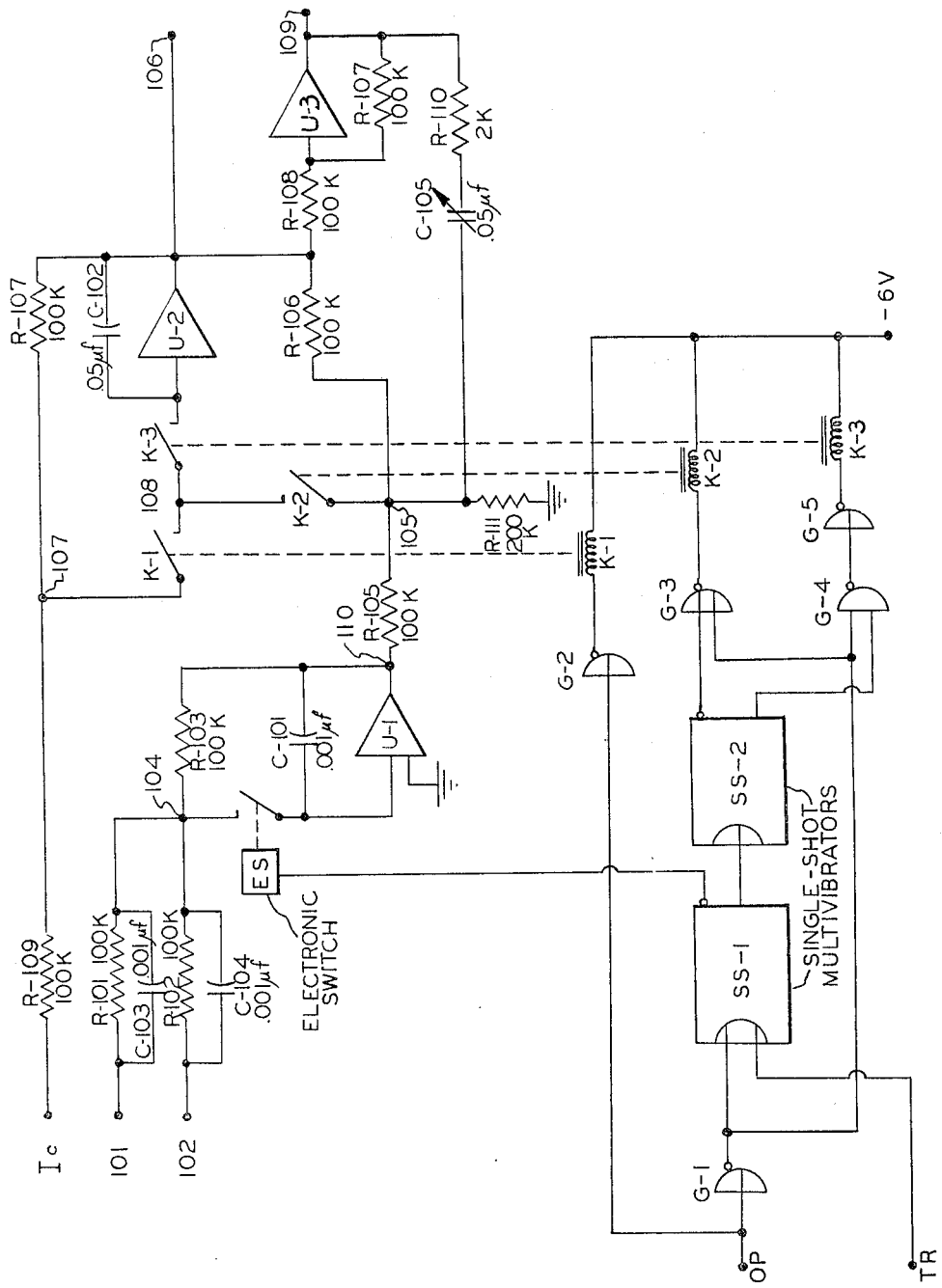

3,381,231
TRACK-TRANSFER SAMPLE-HOLD CIRCUITS
Elmer G. Gilbert, Ann Arbor, Mich., assignor to Applied Dynamics, Inc., Ann Arbor, Mich., a corporation of Michigan
Filed May 28, 1965, Ser. No. 459,776
11 Claims. (Cl. 328—151)

ABSTRACT OF THE DISCLOSURE

A track-hold arrangement having a first track-hold circuit with a short holding time-constant to track input signals with a short aperture time, a second track-hold circuit having a long holding time-constant and switching means to transfer values held by the first circuit to the second circuit for long term storage, with the two circuits being operated in opposite modes, and with positive feedback employed to speed transfer of a signal held by the first circuit to the second circuit.

---

This invention relates to analog computer apparatus, and more particularly, to improved analog tracking circuits. A variety of analog computer computations require that signals be sampled at various selected instants. For example, it frequently is desirable that electronic integrator circuits be capable of being reset upon command to signal levels then present at various terminals in order that such signal levels constitute initial conditions from which integration proceeds. Various applications also require that analog signals sensed or sampled at one instant be held or stored until a later instant. A variety of computer problems, and especially those involving iterative computation, require circuits capable of sampling, upon command, the instantaneous value of a signal, and providing an output signal in accordance with the sampled value for a controlled time interval, until a new sample is taken, which new sample value is then stored for a selected time interval.

One known way to sample and hold such signals is to apply the varying signals from which the samples are to be taken to the "initial condition" or IC terminal of an electronic integrator. When the integrator is switched to its "reset" or "initial condition" mode, the integrator output is rapidly driven to the level of the signal then being applied to the initial condition terminal. Exactly how long it takes for the integrator output to reach the signal level then being applied to the IC terminal depends upon the integrator time-constant, and the shorter the time-constant of the integrator, the sooner the integrator output will match the value applied to the IC terminal. It is highly desirable, in the interests of accuracy, to sample the applied voltage as instantaneously as possible, particularly if the applied voltage may vary rapidly. The preferably brief time during which the applied voltage is sampled is frequently termed the "aperture time," and in order to achieve short aperture times, it is desirable that the integrator time-constant be very short. If the integrator is switched to its "hold" mode after the integrator output level corresponds to the signal level applied to the integrator IC terminal, the integrator output level will remain approximately the same until the integrator is later switched again to its reset or IC mode to take another sample. How long the integrator output will remain accurately at the sampled value depends upon the integrator time-constant, and the longer the time-constant of the integrator, the greater the accuracy with which the integrator will hold the sampled value. Thus it will be seen that such a sample-hold circuit has two directly conflicting requirements, i.e., a requirement for a small time-constant in order to provide a small aperture time, and a requirement for a large time-constant in order to provide accurate long-term holding of the sampled values, and it has been difficult to provide a sample-hold circuit which has both short aperture time and long-term holding accuracy.

A variety of techniques have been used in the prior art in attempts to provide improved sample-hold circuits. Some prior art attempts involve a "brute-force" approach, in which additional high-gain amplifiers are used in order to force the integrator output to the input sample level as soon as possible by the use of great amplifier gain. As well as requiring the provision of additional amplifiers capable of large current output, which amplifiers usually must be stabilized, such circuits are also disadvantageous in that some of them require a number of expensive electronic switches. The invention is a marked improvement over many prior art sample-hold arrangements in that it allows a large number of samples to be taken each second at a much better accuracy than heretofore achieved at such speeds. Rather than using a single circuit having a time-constant which must be a compromise between the small value desired for short aperture time and the large value desired for long-term holding accuracy, the present invention, which I frequently term a "track-transfer" unit, utilizes two different circuits, including a sampling or tracking circuit having a short time-constant, so that a very short aperture time is obtained, and a holding circuit having a relatively long time-constant, so that long-term holding accuracy is readily achieved. In accordance with the present invention, the short time-constant sampling circuit continuously tracks the input signal to be sampled, and upon receipt of a control signal, the sampling circuit samples the input signal and then applies it quickly to the long-time-constant holding circuit for long-term storage. As soon as the sampled signal is applied to the holding circuit, the sampling circuit is then free to track the applied signal again, in preparation for the next sample and transfer command. Thus it is a primary object of the present invention to provide an improved sampling circuit having both a short aperture time and good long-term holding accuracy.

By using a tracking circuit having a time-constant of the order of 100 microseconds and a fast electronic switch, I can provide sampling with an aperture time of the order of 1 microsecond, and by using a holding circuit having a time-constant of the order of .005 second for example, I can obtain very accurate long term holding, merely by promptly transferring signals sampled by the tracking circuit to the holding circuit. The sampling circuit need be capable of storing the sampled signals for only a short time, such as 4 milliseconds, the time required for the holding circuit to track the sampled value. If desired, this arrangement may allow the time-constant of the holding circuit to be thousands of times larger than that of the tracking circuit.

Two further advantages of the invention which are particularly desirable to facilitate iterative computation are (1) the fact that the circuit, unlike conventional sample-hold circuits, may be given an initial condition, and (2) a circuit input signal may be connected to track and sample a circuit output signal, as will be explained below in greater detail. The invention is also advantageous in that it does not require extremely large input current when switched to a track mode nor when tracking rapidly varying input signals, as many prior art sample-hold circuits do.

In order to provide a brief aperture time, the tracking or sampling circuit must be capable of tracking the input signal with minimum time lag, and in order that the transfer interval be reasonably short, it is necessary that the holding circuit track each signal level applied to it as soon as possible, even though the holding circuit has a relatively long time-constant. In accordance with the invention, the sampling circuit tracking lag is minimized by providing an input circuit transfer function which duplicates that of the feedback impedance of the sampling circuit, and the speed of response of the holding circuit is increased greatly by a positive feedback circuit, as will be explained in detail. Thus another object of the invention is to provide an improved sampling circuit of the type described which is capable of tracking signals with a minimum time lag.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompany drawing, in which:

The single figure is an electrical schematic diagram partially in block form, of an exemplary embodiment of the invention.

In the illustrative embodiment shown in the drawing figure the input signal to be sampled is shown as comprising the sum of two input signals which are connected to terminals 101 and 102 and applied via scaling resistors R-101 and R-102, respectively, to terminal 104. A terminal labelled IC is provided to receive an "initial condition" potential, so that the system may be reset upon command to provide the initial condition signal as an output. Few (if any) prior art sample-hold circuits have been capable of accepting an initial condition signal, and such a capability is extremely useful in numerous iterative calculations. Output signals appear at terminals 106 and 109, that at terminal 109 merely being an inverted replica provided by inverting amplifier U-3.

The system has three distinct operating modes (1) Reset, or IC, (2) Operate, and (3) Transfer. When the system is switched to the Reset mode, the output voltage at terminal 106 rapidly changes to a voltage level which is opposite in sign but identical in magnitude to the voltage then existing at the IC terminal (provided R-109 and R-107 have equal values). The negative sum of the input voltages at terminals 101 and 102 is tracked at the terminal 110 during the Reset mode (provided R-101, R-102, and R-103 have equal values), but the output voltage then present at terminal 106 is not affected. During the "Operate" mode, the voltage at terminal 110 tracks the negative sum of the input voltages at terminals 101 and 102, but the system output voltage at terminal 106 remains held at the value it had when the system was switched into the "Operate" mode. During the "Transfer" mode, which comprises several steps of operation initiated by a single timing pulse, tracking of the sum of the input voltages which had been occurring during the previous modes is interrupted. The sampled value, or value of the sum of the input signals at the time tracking is interrupted, is held for a short time (e.g. four milliseconds) by a tracking amplifier circuit having a short time-constant, and during this time the sampled value is applied to a holding amplifier circuit having a long time-constant to be stored there. In the apparatus of the figure, amplifier U-1 comprises the high-speed tracking amplifier, and amplifier U-2 comprises the holding amplifier.

Amplifier U-1 will be seen to track the sum of input signals to terminals 101 and 102 when electronic switch ES is closed, and when switch ES opens, amplifier U-1 will continue to provide a steady output voltage commensurate with the value of the sum of the input signals at the time switch ES was opened. Electronic switch ES is illustrated as a simple mechanical switch in FIG. 1 solely for sake of clarity. In order that amplifier U-1 track the input signal with minimum time lag, capacitors C-103, C-104 may be connected in parallel with the input scaling resistors, as will be further explained below. Since the high-speed tracking amplifier U-1 is connected to track during the "Reset" and "Operate" modes, electronic switch ES is controlled to be closed during those two modes, and to open only during the "Transfer" mode, as will be explained below. Electronic switch ES preferably comprises an electronic switch of the type shown in my copending application Ser. No. 374,341 filed June 11, 1964, but may comprise various other types of electronic switches having comparable operating speed and comparable open and closed characteristics.

Amplifier U-2 is provided with feedback capacitor C-102. With the contacts of relays K-1 and K-3 closed, it will be seen that the "initial condition" voltage from terminal IC is applied as an input to amplifier U-2, and that feedback resistor R-107 is connected in parallel with capacitor C-102, so that the output voltage at terminal 106 will be driven to a level which is opposite in sign to the IC input voltage, and equal in magnitude thereto if resistances R-107 and R-109 are equal, or proportional to the IC input voltage in any event. The amount of time required after closure of switches K-1 and K-3 for the system output voltage at terminal 106 to reach the magnitude of the initial condition voltage at the IC terminal, depends upon the holding amplifier time-constant, which is governed by resistor R-107 and C-102, and the time required after switch ES is closed for the tracking amplifier U-1 input voltage to reach the input signal magnitude depends upon the tracking amplifier time-constant, which is governed by R-103 and C-101. The tracking amplifier time-constant is much shorter than that of holding amplifier U-2 (typically by a factor of 50 to 1000). In order that tracking amplifier U-1 track the sum of the input signals at terminals 101 and 102 with minimum time-lag, capacitors C-103 and C-104 parallel the input scaling resistors R-101 and R-102. During its tracking mode, the feedback impedance $Z_f$ of amplifier U-1 will be seen to be comprised of R-103 and C-101 in parallel. The output voltage $E_o$ of a single input high-gain negative feedback amplifier is frequently expressed as $$E_o = -E_{in} \frac{Z_f}{Z_{in}}$$

It will be seen from the expression that the output voltage will lag or lead the input voltage if the ratio $Z_f/Z_{in}$ is partially reactive. Because feedback resistor R-103 has capacitor C-101 connected in parallel with it during the tracking mode, the quantity $Z_f$ will be seen to contain a reactive component. By connecting capacitors C-103 and C-104 in parallel with input resistors R-101 and R-102, these two capacitors and two resistors may provide an input impedance $Z_{in}$ (for each of the two inputs) having a reactive component to cancel all or at least offset part of the reactive component of the feedback impedance $Z_f$, so that amplifier U-1 can track with little or no time lag. Input capacitors C-103 and C-104 provide reactive components in the $Z_{in}$ quantity of the denominator of the above expression to cancel, or at least substantially offset, the reactive component of the numerator, greatly improving the tracking capability. In order to allow fine adjustment of the input and feedback impedance transfer functions, small adjustable (e.g. 9–50 picofarad) trimmer capacitors (not shown) may be used in parallel with capacitors C-103, C-104 and C-101, and small (e.g. 250 ohm) adjustable trimmer resistances (not shown) may be used in series with resistances R-101, R-102 and R-103. During the "Operate" or "Track and Hold" mode, tracking amplifier U-1 is tracking the sum of the input signals and the holding amplifier is holding whatever signal level it had when the mode began. With the relay K-3 contact open, it will be seen that no input signal is applied to integrator U-2, and hence the output signal at terminal 106 remains constant. Because capacitor C-102 is a relatively large capacitor, amplifier U-2 is capable of holding the output voltage accurately during a relatively long "Operate" mode.

In order to transfer a sampled input signal level from amplifier U-1 to store it in holding amplifier U-2, electronic switch ES is opened for 4 milliseconds and the contacts of relays K-2 and K-3 are closed for about 3.5 milliseconds. The slightly shorter time of 3.5 milliseconds allows for inconsistencies in the relay opening times. In order that the sampled input value represent as nearly as possible an instantaneous value, electronic switch ES is switched from a fully closed condition to a fully open condition as quickly as possible, typically in one microsecond or less. With switch ES open, tracking amplifier U-1 will be seen to be in a "hold" mode. Because tracking amplifier U-1 has a very small time-constant (i.e. C-101 is small), amplifier U-1 is not capable of holding an output voltage very accurately for any extended length of time. However, as well as connecting the U-1 output voltage to the U-2 input circuit, it will be seen that closure of the K-2 and K-3 relays also connects resistor R-106 in parallel with capacitor C-102 around the U-2 amplifier, so that the sampled value stored in tracking amplifier U-1 is immediately applied to amplifier U-2 to be stored. Thus it will be seen that the output signal level of amplifier U-2 will be driven to be proportional in magnitude, though opposite in sign, to the sampled voltage level being held in tracking amplifier U-1. It may be noted that during this time, tracking amplifier U-1 is holding, while holding amplifier U-2 is tracking.

As shown in the figure, capacitor C-105 is connected between terminals 105 and 109. With relays K-2 and K-3 closed, the signal at terminal 106, the output terminal of amplifier U-2, will be seen to be opposite in sign to the input signal at terminal 105, due to the inversion in amplifier U-2, and similarly, the output voltage of amplifier U-3 at terminal 109 will be opposite in sign to that at terminal 106 due to the inversion in amplifier U-3. The double inversion in amplifiers U-2 and U-3 results in positive feedback through resistor R-110 and capacitor C-105 to terminal 105, causing a considerable increase in the response speed of amplifier U-2 when it is tracking. By proper selection of capacitor C-105, the currents in capacitors C-102 and C-105 may be made to almost completely cancel each other so that resistor R-105 need not supply them, greatly improving the tracking speed of amplifier U-2, so that the holding circuit tracks the signal being transferred in a short time even though the holding circuit has a relatively large capacitor. To provide best speed improvement, capacitor C-105 is preferably made adjustable, as by use of a small parallel trimmer capacitor (not shown).

About 3.5 milliseconds after closure, relays K-2 and K-3 are opened, with K-3 preferably being a fast-opening relay, so that holding amplifier U-2 operates in its hold mode for at least some time before reclosure of electronic switch ES reverts tracking amplifier U-1 to its tracking mode. At the end of the 4 milliseconds period, with switch ES closed and relays K-1, K-2 and K-3 all open, the circuit will again be in its "Operate" mode, with amplifier U-1 tracking and amplifier U-2 holding. Because tracking amplifier U-1 need not hold any sampled value any longer than the 3.5 millisecond time period allowed to transfer it to holding amplifier U-2, tracking amplifier U-1 may have the very short time-constant needed to track accurately. And because the charging of holding amplifier U-2 is not related to the system aperture time as in most previous systems, holding amplifier U-2 may be provided with the long time-constant which is needed for accurate long-term holding without increasing system aperture time. Relays K-1, K-2 and K-3 preferably comprise magnetic reed relay switches, but may comprise any other type of switch having similar operating characteristics. In almost all applications the speed requirements are not severe enough to require electronic switches.

The control circuitry for controlling the switches in the drawing includes five inverting OR gates (i.e. NOR gates) labelled G-1 through G-5 and two single-shot multi-vibrators SS-1 and SS-2, all of which are controlled by logic control signals applied at terminal OP and terminal TR. Minus 6 volt signals are termed logic zero of "0" signals, and zero volt signals are termed logic "1" signals. The following schedule indicates the control circuit overall operation:

| Mode | OP | ES | K-1 | K-2 | K-3 |
|---|---|---|---|---|---|
| Reset | 0 | Closed | Closed | Open | Closed |
| Operate | 1 | do | Open | do | Open |
| Transfer | 1 | Open | do | Closed | Closed |
| (Initiated by 0 to 1 transition on terminal TR) (0-3.5 millisec.) | | | | | |
| (3.5-4 millisec.) | 1 | Open | Open | Open | Open |

In the drawing figure, the small circles on various of the logic circuits indicate an inverted logic output. As shown by the table above, the "reset" mode requires switch ES and relays K-1 and K-3 to be closed. A logic zero signal is applied to terminal OP and because G-1 provides a logic one signal to the single-shot SS-1, the single-shot SS-1 cannot be fired. Thus SS-1 provides a logic 1 signal to close switch ES. The logic 0 signal on terminal OP is inverted by gate G-2, which provides an output signal to energize relay K-1. The logic 0 signal on terminal OP provides a logic 1 signal from gate G-1, a logic 0 signal from gate G-4 and finally a logic 1 signal from gate G-5 to energize relay K-3.

To switch to the "Operate" mode, in which only switch ES is closed, a logic 1 control signal is applied to the OP terminal. Receiving a logic 0 signal from gate G-1, single-shot SS-1 remains in its quiescent state, applying a logic 1 voltage to close switch ES. However, because single-shot SS-1 now receives a logic 0 from G-1, it is susceptible to being fired by a logic zero-to-one transition on TR. The logic 1 signal on the OP line provides a logic 0 signal from gate G-2, so that relay K-2 will be deenergized, and provides a logic 1 signal from gate G-4 and a logic 0 signal from gate G-5, so that relay K-3 will be de-energized.

The application of a logic 1 signal to the OP line and a zero-to-one transition on the TR line switches the circuit to its "Transfer" mode. The logic 1 signal applied to the TR line requires a short rise time of less than one microsecond, and its instant of occurrence establishes the sampling instant. The logic 1 voltage on the OP line maintains relay K-1 de-energized. The logic zero output from triggered single-shot SS-1 lasts for a 4 millisecond interval and opens electronic switch ES throughout the interval. The non-inverted output from single-shot SS-1 fires the second single-shot SS-2, providing a logic 0 voltage to gate G-3, and thereby providing a logic 1 voltage to energize relay K-2. The logic 1 voltage from SS-2 provides a logic 0 voltage from gate G-4 and hence a logic 1 voltage to energize relay K-3. Single-shot SS-2 resets about 3.5 milliseconds after being triggered, and as it resets it will be seen that relays K-2 and K-3 will be de-energized. It is desirable that relay K-3 be a quick-opening type, to insure that U-2 is isolated and in its hold mode prior to re-closure of switch ES at the end of the 4 millisecond period when SS-1 resets.

One successful embodiment of the invention has an overall accuracy within 0.01% and a drift rate less than 0.001% per second. Using the 4 millisecond transfer interval mentioned above, it will be appreciated that the track-transfer system could be used to provide approximately 250 samples per second, while maintaining 0.01% accuracy.

It will be appreciated that the function of relay K-1 is solely to allow an externally applied initial condition voltage at terminal IC to be established upon command at the track-transfer unit output terminal. In applications where such initial condition setting capability is not essential, relay K–1, gate G–2, and resistors R–107 and R–109 obviously can be omitted. However, the capability of accepting an initial condition signal is an important advantage, most important in iterative calculations, which the present invention has over prior art sample-hold circuits. And furthermore, because there are two memory capacitors, C–101 and C–102, it is possible to connect one of the input terminals (101 or 102) to track and sample either output terminal 106 or 109, which is also frequently very advantageous, particularly in iterative computation. Such operation obviously is impossible with conventional sample-hold circuits.

The invention may be implemented using standard amplifiers, gates, etc., using either vacuum tubes or solid-state circuit elements. Those skilled in the art will readily recognize that the logic switching circuits shown as utilizing NOR gates may be rearranged in straightforward fashion to accomplish the same overall functions using OR and AND gates, for example. The amplifier circuits may incorporate numerous refinements, such as drift stabilization, for example, which are not shown herein in order to avoid obscuring the present invention.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

Having described my invention, what I claim as new and desire to secure by Letters Patent is:

1. Apparatus for sampling an applied input signal upon command and storing the sampled value, comprising, in combination:
   a first electronic track-hold circuit comprising a first amplifier, a first feedback capacitor connected between the output and input circuits of said first amplifier, an input terminal, a first feedback resistance connected between the output circuit of said amplifier and said input terminal, and first switching means for selectively connecting and disconnecting said input terminal to and from the input circuit of said amplifier to switch said first track-hold circuit between tracking and holding modes, respectively;
   first impedance means for applying said input signal to said input terminal;
   a second electronic track-hold circuit comprising a second amplifier, a second feedback capacitor connected between the output and input circuits of said second amplifier, a second input terminal, a second feedback resistance connected between the output circuit of said second amplifier and said second input terminal, and second switching means for selectively connecting and disconnecting said second input terminal to and from the input circuit of said second amplifier to switch said second track-hold circuit between tracking and holding modes, respectively;
   second impedance means connecting the output circuit of said first amplifier to said second input terminal;
   means responsive to a command signal input for operating said first switching means for a predetermined period of time to switch said first track-hold circuit to its holding mode, and for temporarily operating said second switching means during a portion of said predetermined period to switch said second track-hold circuit temporarily from its holding mode to its tracking mode.

2. Apparatus according to claim 1 in which said first impedance means comprises a parallel resistance-capacitance network.

3. Apparatus according to claim 2 in which the time-constant of said parallel resistance-capacitance network is substantially equal to the time-constant of said first electronic track-hold circuit connected in its tracking mode.

4. Apparatus according to claim 1 in which said first impedance means comprises a resistance-capacitance network having a time-constant substantially equal to the time-constant of said first electronic track-hold circuit connected in its tracking mode, and in which the time-constant of said second track-hold circuit in its holding mode is at least 50 times as great as the time-constant of said first electronic track-hold circuit connected in its holding mode.

5. Apparatus for sampling an applied input signal upon command and storing the sampled value, comprising, in combination:
   a first track-hold circuit connected to track said input signal during its track mode and to hold the last signal value tracked upon being switched from its track mode to its hold mode;
   a second track-hold circuit connected to track the output signal from said first track-hold circuit during the track mode of said second track-hold circuit, and to hold the last signal value tracked upon being switched from its track mode to its hold mode;
   means for switching said first track-hold circuit to its hold mode for a pre-determined period of time;
   and means for switching said second track-hold circuit to its track mode for a portion of said pre-determined period of time.

6. A track-hold circuit, comprising, in combination:
   an input terminal for receiving an input signal to be tracked;
   a first polarity-inverting amplifier having input and output circuits;
   a first feedback capacitor connected between said output and input circuits of said first amplifier; a first feedback resistor connected between the output circuit of said first amplifier and said input terminal;
   a second polarity-inverting amplifier having input and output circuits;
   a second feedback resistor connected between said output and input circuits of said second amplifier;
   circuit means connecting the output signal from said first amplifier to the input circuit of said second amplifier;
   a second capacitor connected between said output circuit of said second amplifier and said input terminal;
   and switching means for selectively connecting said input terminal to the input circuit of said first amplifier.

7. Apparatus for sampling an applied input signal upon command and storing the sampled value, comprising, in combination:
   a first track-hold circuit including a first amplifier and first capacitor means;
   first circuit means for applying said input signal to said first track-hold circuit;
   a second track-hold circuit including a second amplifier and second capacitor means,
   each of said track-hold circuits including switching means for switching said circuits between tracking modes and holding modes;
   means for switching said first track-hold circuit to its holding mode while simultaneously switching said second track-hold circuit to its tracking mode and simultaneously applying the input signal from said first track-hold circuit as an input signal to said second track-hold circuit.

8. Apparatus according to claim 7 in which the time-constant of said second track-hold circuit connected in its holding mode is at least 50 times greater than the time-constant of said first track-hold circuit connected in its holding mode.

9. Apparatus according to claim 7 in which said first circuit means comprises a resistance-capacitance network having a time-constant substantially equal to that of the feedback impedance of said first amplifier connected in its tracking mode.

10. Apparatus according to claim 7 in which said second track-hold circuit includes a third amplifier connected to receive and invert the output signal from said second amplifier to provide a further signal; and third capacitor means for applying said further signal as an input signal to said second track-hold circuit while said second track-hold circuit is connected in its tracking mode.

11. Apparatus for sampling an applied input signal and storing the sampled value, comprising, in combination:

a first track-hold circuit comprising a first amplifier, a first storage capacitor, a first resistance, a first input terminal, and first switching means for selectively connecting said capacitor and resistance with respect to said amplifier to switch said first track-hold circuit between tracking and holding modes, respectively;

first impedance means for applying said input signal to said first input terminal;

a second track-hold circuit comprising a second amplifier, a second storage capacitor, a second resistance, a further terminal, and second switching means for selectively connecting said second capacitor and second resistance with respect to said second amplifier to switch said second track-hold circuit between tracking and holding modes, respectively;

second impedance means connecting the output circuit of said first amplifier to said further terminal;

and means for controlling said switching means to operate said track-hold circuits in a first system mode with said first track-hold circuit in its tracking mode and said second track-hold circuit in its holding mode, and in a second system mode for a pre-determined period of time with said first track-hold circuit in its holding mode during said period and said second track-hold circuit in its tracking mode during at least a portion of said period, thereby to transfer the signal value held in said first track-hold circuit during said period to said second track-hold circuit.

References Cited

UNITED STATES PATENTS 3,119,984   1/1964   Brandt et al. _____ 328—151 XR
3,249,925   5/1966   Single et al. _____ 328—127 XR JOHN S. HEYMAN, *Primary Examiner.*

ARTHUR GAUSS, *Examiner.*

J. JORDAN, S. D. MILLER, *Assistant Examiners.*